United States Patent [19]
Beach

[11] 3,991,498
[45] Nov. 16, 1976

[54] LEARNING AID

[76] Inventor: William R. C. Beach, 4421 NW. 4th Court, Fort Lauderdale, Fla. 33317

[22] Filed: Mar. 10, 1976

[21] Appl. No.: 665,856

[52] U.S. Cl. .................................... 40/86 R; 35/76
[51] Int. Cl.² ........................................ G09F 11/24
[58] Field of Search ............... 35/35 G, 76; 40/86 R, 40/117

[56] References Cited

UNITED STATES PATENTS

| | | | |
|---|---|---|---|
| 1,760,785 | 5/1930 | Sledge | 40/86 R |
| 2,163,523 | 6/1939 | Whitmyre | 40/86 R |
| 3,513,577 | 5/1970 | Kleinman | 40/86 R |

FOREIGN PATENTS OR APPLICATIONS

| | | | |
|---|---|---|---|
| 1,421,031 | 11/1965 | France | 40/86 R |

*Primary Examiner*—Harland S. Skogquist
*Attorney, Agent, or Firm*—Oltman and Flynn

[57] ABSTRACT

A learning aid particularly useful by one learning a foreign language, includes an openable box containing a double reel and web assembly wherein the web has printed matter on it which can be viewed through a window area of the cover of the box, and the box contains cartridge means for carrying the double reel and web assembly during insertion of the assembly in and removal of the assembly from the box. This permits quick insertion and removal of the cartridge means and the double reel and web assembly as a unit. A larger number of such cartridge and reel units may be provided for use in a single viewing box, thus facilitating the learnings of a large amount of printed material.

8 Claims, 4 Drawing Figures

LEARNING AID

BACKGROUND OF THE INVENTION

Boxes containing double reel and web assemblies have been provided for many different purposes. Examples of such devices are shown in U.S. Pat. No. 1,756,208—Peelan and U.S. Pat. No. 2,163,523—Whitmyre among others. Known devices have not had provisions for facilitating insertion and removal of reel and web assemblies nor for convenient accommodation of a large number of different reel and web assemblies in a single box.

SUMMARY OF THE INVENTION

The present invention is a learning aid for facilitating the learning of a large amount of printed material in a convenient manner which facilitates the learning process. The webs of several different double reel and web assemblies are imprinted with the material to be learned. Each double reel and web assembly is inserted into a cartridge which facilitates storage, shipping and handling of the printed material. When a user wishes to concentrate on a particular selection of printed material, the user selects the appropriate cartridge, and places that cartridge in an openable box which has a cover including a window area through which the printed material may be viewed. In a preferred embodiment, the box includes a bottom shell which receives the cartridge, and both the bottom shell and the cartridge have open-ended slots which removably receive the reels of the reel and web assembly. The cover also preferably includes slots for accommodating the reels and the reels have knobs located outside the box which can be turned for forward winding and reverse winding of the web to permit selection of different units of printed material on the web for viewing.

Accordingly, it is an object of the present invention to provide a cartridge for a learning aid to facilitate insertion and removal of a double reel and web assembly relative to a box.

Another object of the invention is to provide a plurality of cartridges adapted to be inserted and removed relative to a single viewing box.

A further object of the invention is to make provisions in the box and the cartridge to enable quick and convenient insertion and removal of a double reel and web assembly relative to the box.

Among the other objects of the invention are to make the learning aid convenient to use, inexpensive, capable of handling a variety of printed material, and readily manufacturable in large quantities.

Other objects of this invention will appear from the following description and appended claims, reference being had to the accompanying drawings forming a part of this specification wherein like reference characters designate corresponding parts in the several views.

Figure 1:
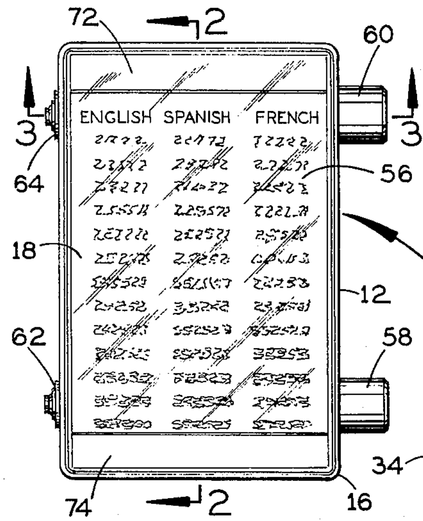
FIG. 1 is a plan view of a learning aid in accordance with a preferred embodiment of the invention.
Figure 3:
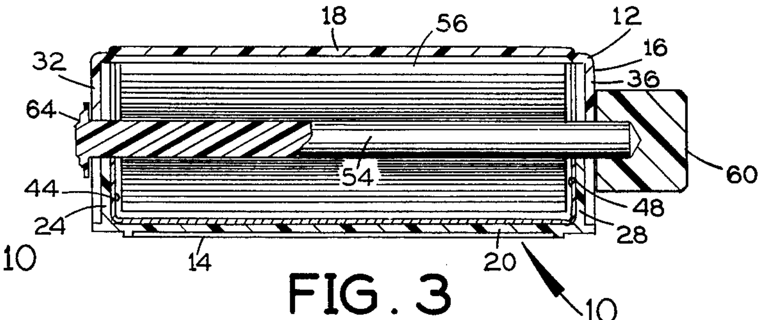
FIG. 3 is a sectional view taken along line 3—3 of FIG. 1 and looking in the direction of the arrows.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The learning aid 10 includes an openable box 12 which consists of a bottom shell and a cover means 16 for covering the bottom shell. In the preferred embodiment, the bottom shell 14 and the cover means 16 are entirely made of transparent plastic material. The cover means 16 has a window area 18 in the form of a top plate through which the contents of the box may be viewed.

Figure 2:
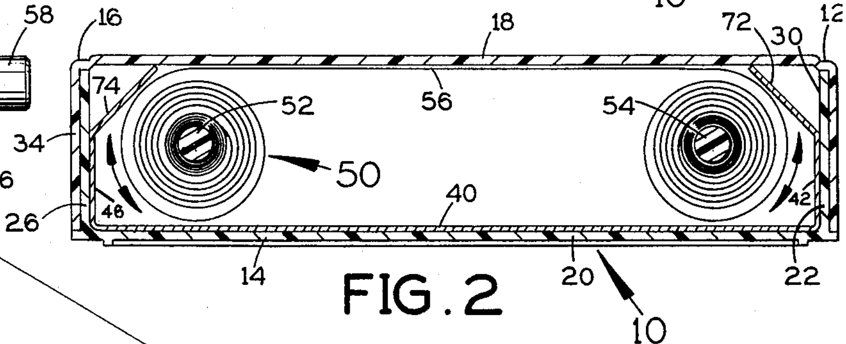
FIG. 2 is a sectional view taken along line 2—2 of FIG. 1 and looking in the direction of the arrows.
Figure 4:
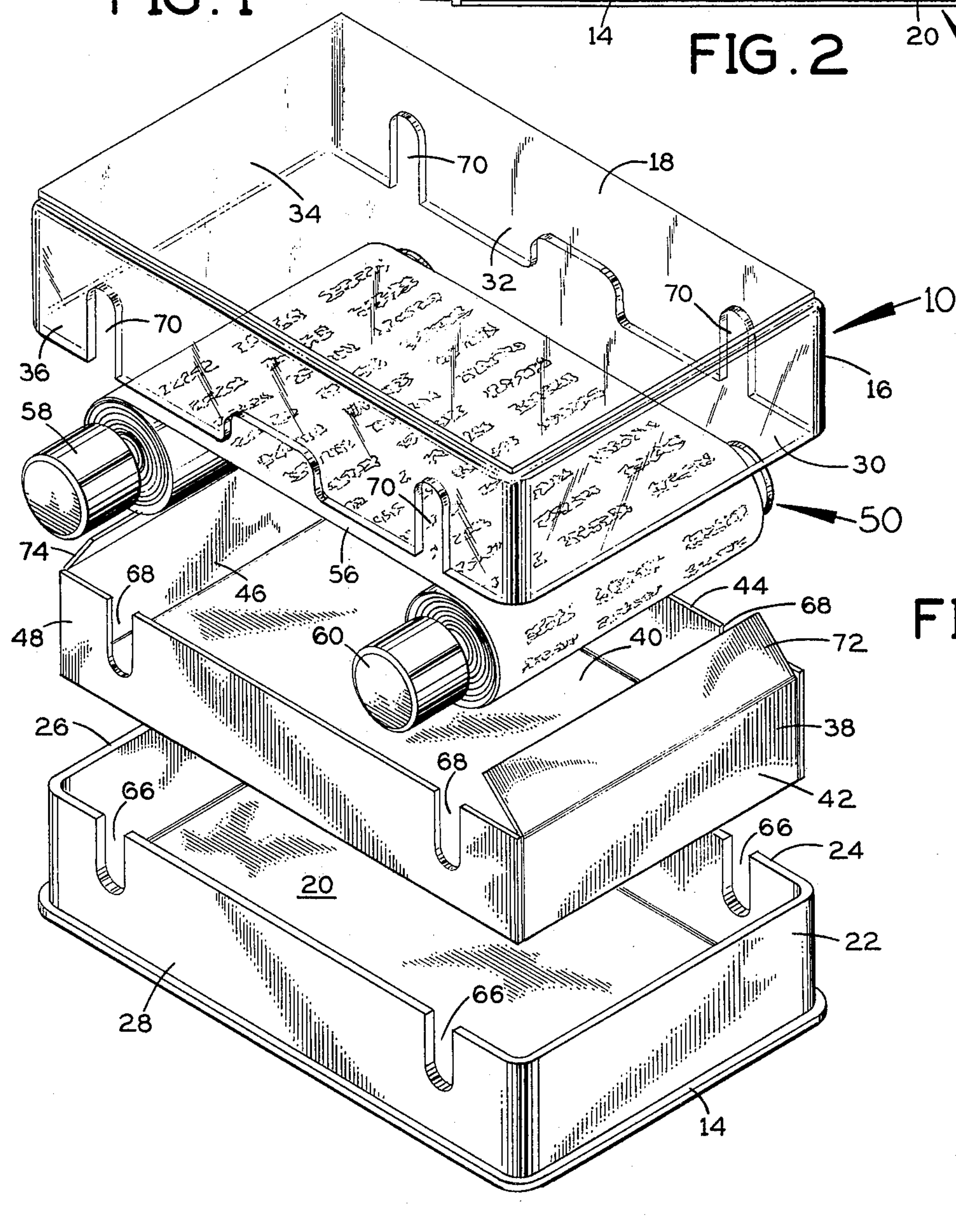
FIG. 4 is an exploded view of the learning aid of FIG. 1 showing the component parts of the device separated from each other to reveal the internal construction thereof.

The bottom shell 14 includes a bottom plate 20 and four upstanding sides 22, 24, 26, and 28. The cover means 16 includes the top plate 18 and four downwardly depending vertical sides 30, 32, 34 and 36. As shown in FIG. 2 particularly, when the cover means 16 is placed over the bottom shell 14, the sides 22, 24, 26 and 28 are received closely within the sides 30, 32, 34 and 36.

Inside the box 12, there is a cartridge means 38 which also comprises a shell having a base plate 40 and four upstanding sides 42, 44, 46 and 48. The cartridge means 38 receives the double reel and web assembly 50 which includes first and second reels 52 and 54 (FIG. 2) on which a web 56 can be wound and unwound in forward and reverse directions relative to the window area 18. This forward and reverse winding of the web 56 permits selection and viewing of particular materials which are printed on the web 56.

A large number of cartridge and reel-web assemblies may be used with a single box. Thus a variety of printed material can be printed on the webs and the user can select particular cartridges for viewing of particular printed materials. The user also selects a given unit of printed material by winding and unwinding the reels 52 and 54. Examples of printed units might be colors, the months, the days of the week, numbers, roman numerals, states and capitols, seasons and directions. These units are particularly useful if the materials in a given unit are printed in different languages as indicated in FIG. 1 where the headings are English, Spanish and French. Thus, the learning aid is especially useful to a person who is learning a foreign language.

The reels 52 and 54 project entirely through the box 12 and the cartridge means 38 so that knobs 58 and 60 can be received on reels 52 and 54 respectively, the knobs being located entirely outside the box 12 as shown in FIG. 1. The knobs are manipulated to wind the web 56 in the forward or reverse direction. In the preferred embodiment, the reels 52 and 54 have flanges 62 and 64 at the ends thereof opposite the knobs 58 and 60, the flanges also being located entirely outside the box 12.

Sides 24 and 28 of bottom shell 14 have vertical, open-ended slots 66 therein for quick insertion and removal of the reels 52 and 54. Cartridge means 38 also has open-ended, vertical slots 68 therein for receiving the reels 52 and 54. The cover means 16 has downwardly facing open-ended vertical slots 70 for receiving the reels 52 and 54. Thus, there are four slots 66 in the bottom shell 14, four slots 70 in the cover means 16, and four slots 68 in the cartridge means 38. The slots 66 and 68 open upwardly, and the slots 70 open downwardly. Slots 66 and 68 should be located at least in sides 28 and 48 respectively, and slot 70 should be located at least in side 36. Slots 66 in side 24, slots 68 in side 44, and slots 70 in side 32 are desirable because they facilitate location of the flanges 62 and 64 outside the box. Thus, the reels 52 and 54 are confined laterally by the knobs 58 and 60 and the flanges 62 and 64 for rigidly supporting the reels.

The two opposed sides 42 and 46 of the cartridge means 38 have wings 72 and 74 which are folded partially over the reels 54 and 52 for limiting the portion of the web 56 which can be viewed through the window area 18.

In operation, a particular cartridge 38 is selected. This process of selection automatically identifies the particular printed material which will be viewed by the user. The selected cartridge 38 and the reel and web assembly 50 contained therein are placed inside the bottom shell 22 with the reels 52 and 54 being received in slots 66. The cover means 16 is then placed over the bottom shell 22 with the reels 52 and 54 being received in the slots 70. The user rotates one of the knobs 58 and 60 to wind the web 56 either in the forward or in the reverse direction until a particular unit of printed material is visible through the window area 18. Then the user concentrates on this particular unit of printed material for the purpose of learning that material.

I claim:

1. In a learning aid including,
an openable box comprising a bottom shell and a cover means for covering said bottom shell; and
a double reel and web assembly in said box including a web and first and second reels for forward winding and reverse winding said web on said reels;
said cover means including a window area for viewing of printed material on said web;
the improvement comprising:
cartridge means in said box for carrying said double reel and web assembly during insertion of said assembly in and removal of said assembly from said box;
said cover means being removable from said bottom shell to permit insertion and removal of said cartridge means and said assembly as a unit.

2. The learning aid as claimed in claim 1 in which:
said cartridge means comprises a cartridge shell having a base and upstanding sides which fit within said bottom shell of said box.

3. The learning aid as claimed in claim 2 in which:
said bottom shell also includes a base and upstanding sides; and
at least one opposed pair of said upstanding sides of said shells have vertical, open-ended slots therein receiving said first and second reels respectively.

4. The learning aid as claimed in claim 3 in which:
said cover means includes a top plate and depending sides extending down from said top plate; and
at least one of said depending sides has vertical, open-ended slots therein receiving said first and second reels respectively.

5. The learning aid as claimed in claim 4 in which:
said slots of said cover means open downwardly and said slots of said shells open upwardly.

6. The learning aid as claimed in claim 5 in which:
said reels have knobs thereon located outside said box.

7. The learning aid as claimed in claim 3 in which:
two opposed upstanding sides of said cartridge shell have wing means thereon folded partially over said first and second reels respectively for limiting the portion of said web visible through said window area.

8. The learning aid as claimed in claim 7 in which:
said bottom shell and said cover means are entirely transparent.

* * * * *